United States Patent [19]

Rabuse et al.

[11] Patent Number: 4,562,102
[45] Date of Patent: Dec. 31, 1985

[54] ROLL OF PREDETERMINED LENGTH STRIPS OF PRESSURE-SENSITIVE TAPE

[75] Inventors: George R. Rabuse, Sunfish Lake; Gary R. Hanson, Minneapolis, both of Minn.

[73] Assignee: Minnesota Mining and Manufacturing Company, St. Paul, Minn.

[21] Appl. No.: 585,140

[22] Filed: Mar. 1, 1984

[51] Int. Cl.[4] .......................... B32B 3/08; B32B 3/10
[52] U.S. Cl. ........................................ 428/43; 428/54; 428/77; 428/137; 428/194; 428/906; 156/90
[58] Field of Search ................ 428/906, 43, 77, 194, 428/137, 54

[56] References Cited

U.S. PATENT DOCUMENTS

| | | | |
|---|---|---|---|
| 2,836,290 | 5/1958 | Braun | 206/447 |
| 3,537,343 | 11/1970 | Woodward | 83/1 |
| 4,292,360 | 9/1981 | Riedel et al. | 428/343 X |

FOREIGN PATENT DOCUMENTS 2909276 9/1980 Fed. Rep. of Germany ........ 428/43

Primary Examiner—Alexander S. Thomas
Attorney, Agent, or Firm—Donald M. Sell; James A. Smith; John C. Barnes

[57] ABSTRACT

A roll of pressure-sensitive tape material which is divided into predetermined lengths by perforations transversely of the length of the tape and each length of tape is separated by a second length of tape and by perforations which provide means for grasping and controlling the length of tape as it is dispensed to avoid contamination of the adhesive on the predetermined length of tape.

14 Claims, 3 Drawing Figures

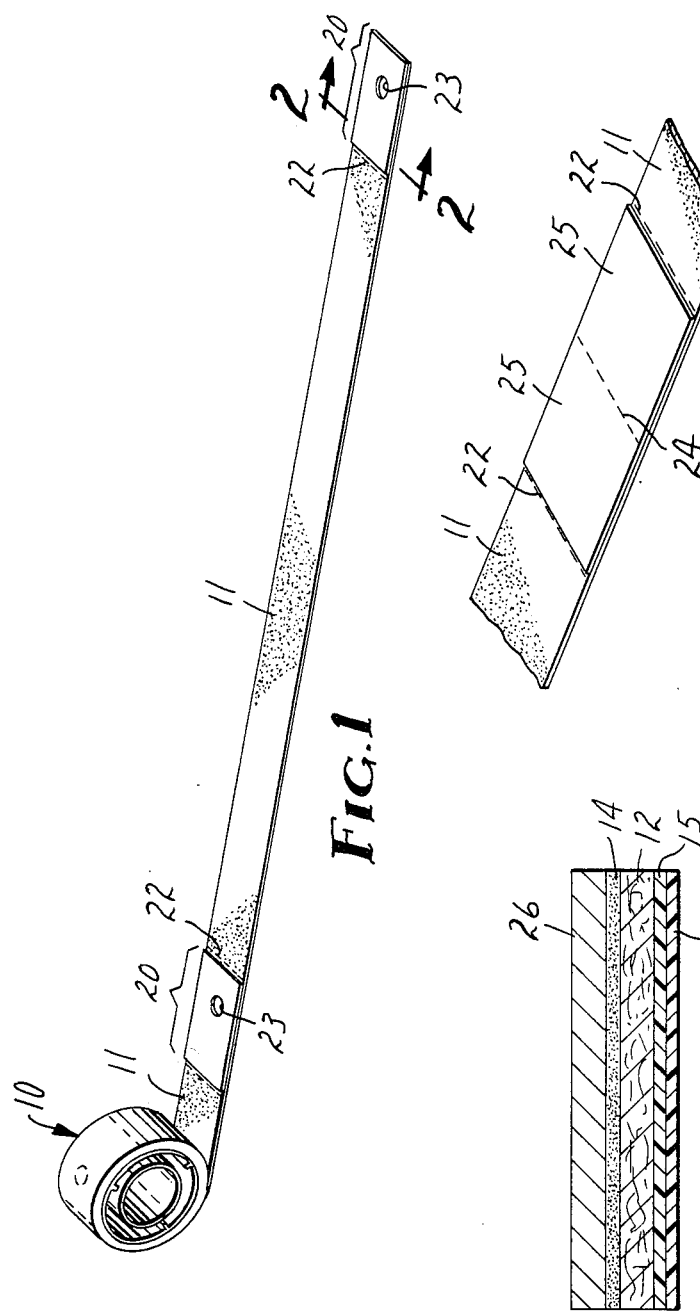

ROLL OF PREDETERMINED LENGTH STRIPS OF PRESSURE-SENSITIVE TAPE

BACKGROUND OF THE INVENTION

1. Field of the Invention

This invention relates to a roll of pressure-sensitive adhesive tape material formed into a plurality of discrete lengths of tape, and more particularly, to predetermined lengths of tape which are joined by tape segments which are separable from the predetermined lengths of tape, which tape segments define areas which may be grasp to position a said length of tape and then separated therefrom.

2. Description of the Prior Art

This invention relates to an improved method of packaging strips of tape adapted for use in binding sheets together, and in particular, to a method of providing a roll of strips, with a predetermined number of strips in the roll, with the strips interconnected by tape segments which define handles permitting the strips to be withdrawn from the roll without the fingers grasping the tape strips and contaminating the adhesive.

There are many articles which are joined in series and wound in a roll and joined by perforations. Pressure-sensitive adhesive tape has always been wound in rolls, and the unwinding is permitted by grasping the free end of the tape and peeling the outer convolution of tape from the adjacent convolution. Predetermined lengths of tape have been mechanically dispensed but it is not known, except for label stock or other liner supported articles, to join discrete lengths of a pressure-sensitive adhesive tape without a release liner in a roll with the pressure-sensitive adhesive strips separated from each other by a length of tape or a tape segment which is free of adhesive or has the adhesive detackified to permit one to grasp the end of the roll and peel the tape from the roll to dispense a strip of predetermined length.

SUMMARY OF THE INVENTION

The present invention provides a new product comprising a strip of predetermined lengths of tape which are joined by tape segments which are free of adhesive or comprise a strip laminated to the tape to provide a handle for dispensing the strip of predetermined lengths of tape which are wound in a roll. The roll of tape comprises a short length of tape joined along a transverse perforate line to a predetermined length of tape which is joined by a perforate line to a second short length of tape which is joined by a perforate line to another short length of tape or a further predetermined length of pressure-sensitive tape etc. The short length of tape between the perforations and which join the predetermined lengths of tape may have a strip of paper adhered to the adhesive coated surface of the tape. For use in binding sheets together it is desirable that a locating notch be formed in the short sections of tape to locate the predetermined lengths of tape at one end. The perforations between the adjacent short lengths of tape and/or the predetermined lengths of tape provide means for readily separating the short lengths of tape from the predetermined lengths of tape after the predetermined lengths of tape have been applied.

The tape comprises a backing of nonwoven fibrous material coated on one surface with an acrylate adhesive and coated on the opposite surface with a release coating permitting the same to be convolutely wound without transfer of the adhesive from the coated surface. The strip of material is perforated transversely of its length at closely spaced positions to define short lengths of tape between the predetermined lengths of tape. Small segments of paper may cover the short lengths of tape between the perforations to provide a handle at the leading end of each predetermined length of tape. This laminated area of the tape may be formed with a hole through the tape affording reception of a locating pin to locate the leading end of a predetermined length strip of tape.

BRIEF DESCRIPTION OF THE DRAWINGS

The present invention will be further described and will reference the accompanying drawing wherein:

FIG. 1 is a perspective view of a roll of tape strips according to the present invention;

FIG. 2 is a cross sectional view taken along the line 2—2 of FIG. 1; and

FIG. 3 is a perspective view of a length of tape from a roll showing a second embodiment of the tape.

DESCRIPTION OF THE PREFERRED EMBODIMENT

The present invention is directed to a wound roll comprising a concatenation of pressure-sensitive adhesive strips for use in binding sheets together. The successive strips are separated by intermediate strips which permit the dispensing of the strips without contamination of the adhesive on one side of the tape by the fingers grasping the tape to pull it off the roll. The contamination of the adhesive can discolor the tape leaving a finger print or smudge and/or destroy the adhesive quality of the adhesive so it will not hold as well.

The strips illustrated are adapted for use with a binding device which prepares a stack of sheets for binding by shingling or offsetting the edges of the sheets along the edge to be bound and positioning the edges on a platen. The strip of tape of the present invention is then placed over the offset edges and placed in contact with the edges. The tape strip is supple and will conform to the step-like treads and risers of the sheets.

The roll 10 of the present invention comprises a plurality of strips of tape 11 as illustrated in the drawing, each comprising a backing 12 with a coating on one surface of a pressure-sensitive adhesive 14. The backing 12 is preferably a unified nonwoven fibrous fabric carrying a continuous coating of pressure-sensitive adhesive 14. The backing 12 is also coated with a barrier coating 15 on the surface opposite the adhesive coated surface to restrict migration or viscoelastic flow of the adhesive 14 to the opposite surface of the tape. The barrier coating 15 is coated with a release coat or low-adhesion backsizing 16 to permit unwinding and separation of one strip in the roll from the other.

As shown in FIG. 1 the strips of tape 11 are separated by shorter strips 20 which strips 20 are readily separated, along weakened or preferably perforated lines 22, from the strips of tape 11. The strips of tape 11 are of a predetermined length and the strips 20 define tabs or handles to permit the user to grasp a discrete length of tape 11, peel and separate it from the roll and position the tape on a receptor surface without making contact with the adhesive 14 on the strip of tape 11. When the tape strip 11 has been applied to the receptor the strip 11 is readily separated along the perforate line 22 from the roll and then the strip 20 which was used to locate the free end of the roll is separated along the perforate line 22. The strips 20 have an aligning or locating opening 23 formed in the strip to position the face end of the tape.

The embodiment shown in FIG. 3 illustrates strips of tape 11 which are separated by a shorter length of tape to define the tabs or handles where the shorter length is also divided along a perforate line 24 to divide the tape into two sections 25. In this embodiment the strip of tape 11 may have a tab 25 at each end of the strip after it is removed from the roll. The strip of tape is removed by grasping a tab 25 and unwinding the strip 11 and is then separated from the roll by grasping the trailing tab 25 and separating the unwound strip of tape 11 and the trailing tab 25 from the roll along the perforated line 24. The tape strips are dispensed and separated from the roll without the need for a cutting member and can be placed on the receptor free of contamination by the user. The tabs are then separated readily from the applied strip.

An example of the backing 10 for the presently preferred embodiment of the adhesive tape and process of making is hereinafter described.

Staple viscose-rayon textile fibers having a length in the range of 1 to 2 inches (25.4 to 50.8 mm), are formed into a continuous fluffy web by a garnett machine or the like, or by a "Rando-Webber" machine (sold by Curlator Corp., Rochester, N.Y.). A typical web is composed of 1½ denier fibers of 1¼ inch length (31.75 mm) adapted to provide a fiber weight in the finished fabric of about 75 to 100 pounds per thousand square yards (40.77 kilograms to 54.36 kilograms per thousand square meters). The nonbundled staple fibers are thereby randomly interlaced into a loose fluffy layer wherein the fibers cross over and under each other so as to be held together by mechanical and frictional forces.

This fluffy fiber web is then fed through the nip of a pair of horizontal squeeze rolls, the lower one of which dips in an aqueous bath of fiber-binding rubbery sizing latex. This results in the fluffy web being compacted to a tissue-like condition and being wetted and impregnated without excess by the sizing solution. The moving web is then dried by engagement with a series of rotating heated drying cylinders located below a forced-draft ventilating hood, thereby unifying the fabric by adhesive interbonding of the interlaced fibers at their crossing points by means of the dried sizing agent, which also imperceptibly coats the individual fibers without filling up the interstices or appreciably affecting the porosity of the product. The sizing also prevents fuzzing. This provides the porous backing upon which the adhesive is to be subsequently applied.

The preferred sizing agents for binding the fibers are water-dispersible rubbery acrylate polymer latices which dry on the fibers to be a nontacky state. These are well known in the textile industry. A suitable example is "Rhoplex B-15," sold by Rohm and Haas Co., an aqueous dispersion containing 45% acrylic polymer solids by weight, and which is diluted with water to provide a sizing bath having a polymer solids concentration of about 28%. The concentration is adjusted so that the finished dried fabric will have a polymer sizing weight of 30–70% of the total fabric weight and preferably about equal to the fiber weight.

The presently preferred pressure-sensitive adhesive 14 is a pure rubbery copolymer of isooctyl acrylate and acrylic acid in 94:6 ratio; this type being described in Ulrich's U.S. Pat. No. Re. 24,906. The original solvent dispersion thereof is coated on a heated drum from which the dried polymer is removed and redispersed in a mixed solvent of heptane and isopropyl alcohol (70:30) to provide a 22% solution of coatable viscosity. This procedure eliminates volatile ingredients of the original polymer solution.

This adhesive solution is then coated on a moving liner having an insoluble, heat-resistant, shiny-smooth, antistick surface (such as a paper liner carrying a silicone resin release coating) in a wet coating weight adequate to provide a dry adhesive weight of about 150 pounds per thousand square yards (81.5 kilograms per 1000 square meters). This wet adhesive coated web is promptly drawn into and through a hot air heating oven so arranged that after initial drying of the adhesive to a semi-dry state, the above-described backing web is layed down on the adhesive and becomes adhesively laminated thereto. An air temperature of 100–150 degrees F. (37.8–65.6 degrees Celcius) is preferably employed. Too high a temperature will cause a spongy adhesive coating or make control difficult. The objective at this point is to partially dry the adhesive to a degree that will prevent wicking through the superimposed porous backing fabric. Continuing through the drying oven, the laminated "sandwich" web is further heated to fully eliminate residual solvent and thereby complete the drying. In this example, satisfactory results have been obtained by passing the laminated web through successive oven sections adapted to heat it at 100 degrees F. (37.8 degrees Celsius) for 2½ minutes, then at 150 degrees F. (65.6 degrees Celsius) for 2½ minutes, and finally at 200 degrees F. (93.3 degrees Celsius) for 1½ minutes.

The resultant adhesive sheeting has a caliper thickness of 6 to 9 mils (150 to 225 microns).

The barrier coat 15 is typically a solvent-dispersible rubbery polymer which when dry on the backside of the adhesive/backing laminate forms a nontacky continuous film. A suitable example is "VAGH 1," supplied by Union Carbide Chemicals Co. which is a vinyl terpolymer composed of 92 parts vinyl chloride, 6 parts vinyl acetate and 2 parts vinyl alcohol which is dispersed in toluene and methyl iso-butyl ketone to a solids concentration of 15% by weight. The coating should comprise of between 1 and 3 grains per 24 square inches (0.0649 and 0.1947 grams per 154.8 square centimeters) of dry VAGH so as to continuously coat the backing over the fibers and adhesive which exists in the intersices of the porous backing leaving a nonporous, nontacky tape surface. The barrier coat 15 also increases the tensile strength of the tape strip 6 and reduces soiling of the strip.

Preferably, a low-adhesion backsizing 16 is then imparted to the barrier coated surface of the backing fabric. This backsize is so extremely thin as to be imperceptible. This low-adhesion backsizing results in a surface having a reduced adhesion to the tacky pressure-sensitive adhesive and permits linerless rolls of tape or pad arranged strips that can be separated with less effort than would be the case if this backsize were omitted. A preferred low-adhesion backsize 16 is a silicone such as "SYL-OFF" 294 supplied by Dow Corning Corp.

After drying of the backsizing 16 the liner-mounted adhesive-coated web is wound into large jumbo rolls, and is ready for subsequent conversion into tape rolls or strips of desired width or length. The backing is of a nature that permits slitting of tape with straight non-ravelling edges.

The jumbo roll may be unwound and slit to the width of the finished tape rolls and the bands of paper and perforations are placed at appropriate locations and the tape is wound into short length rolls of e.g. 20 strips of tape 11. The bands of paper 26 are applied to define the strips 20. The cutting of the perforations affords a cutting of approximately sixty (60) percent of the width of each strip. The openings 23 can be punched during the perforating.

As an alternative to the use of bands of paper as a laminate to form readily identifiable tabs or handles, the adhesive 14 may be coated with glass beads, pigments or other materials to provide the adhesive detactifying and form the tabs or handles.

The strips of tape 11 are one-half to one inch wide (1.27 to 2.54 centimeters) and 11 inches (27.94 centimeters) long when the strips of tape are used to bind sheets of paper together as described in copending application Ser. No. 533,507, filed Sept. 19, 1983, and assigned to the assignee of this application. The tape for binding other sizes of paper, e.g., DIN size A-4, will have dimensions accordingly. The strips 20 are 1.5 inches (3.8 centimeters) long, and when perforated to separate, they are perforated at the middle.

The present invention is adaptable for use with tapes suitable for uses other than binding sheets together. Suture strips or strips of tape used for other medical purposes, bandaging e.g., for packaging, box sealing etc. may be packaged in precut strips with adjacent separable tabs in accordance with the teachings of this invention. Other changes in construction or tape sizes may be made without departing from the invention as recited in the appended claims.

We claim:

1. A pressure-sensitive adhesive tape product comprising a roll of pressure-sensitive adhesive tape comprising a backing having a release coating on one surface and a pressure-sensitive adhesive coating on the opposite surface and having the adhesive coating contacting the release coating in the wound roll and said tape having transversely extending perforations at spaced intervals along the length of the roll to provide short tab portions of tape between the perforations separating second predetermined lengths of tape having a length substantially different from said tab portions, wherein said tab portions between said perforations and said second predetermined lengths of tape are consecutive through the length of the roll to provide a predetermined number of said second predetermined lengths of tape.

2. A roll of pressure-sensitive adhesive tape according to claim 1 wherein a piece of material is laminated to the adhesive coated surface of the tape along said tab portions of tape between said perforations.

3. A roll of pressure-sensitive adhesive tape according to claim 2 wherein said short tab portions of tape have a hole punched through the surface of the tape affording alignment of a said second predetermined length of tape.

4. A roll of pressure-sensitive adhesive tape according to claim 1 wherein said second predetermined lengths of tape having a length substantially greater than said short tab portions of tape between adjacent perforations.

5. A roll of pressure-sensitive adhesive tape according to claim 1 wherein said short tab portions of tape are transversely perforated between said aforementioned perforations to permit facile separation of said tab portions into two parts.

6. A concatenation of strips of supple pressure-sensitive adhesive tape for use in binding sheets of paper together and joined together by nonadhesive sections affording the unwinding of said strips from a roll without contact with the adhesive coated surface of said strips, said strips having a length substantially greater than said nonadhesive sections and said nonadhesive sections being separable from said strips as said tape has perforations extending transversely thereof in relationship to said strips, said perforations being located adjacent each end of each nonadhesive section.

7. A concatenation of strips of tape as claimed in claim 6 wherein said tape comprises:
   a porous nonwoven fibrous backing of polymeric material,
   a coating of an acrylic pressure-sensitive adhesive on one surface of the backing, and
   a barrier layer on the opposite surface of the backing to cover the surface of the backing and interstices between the fibers to restrict adhesive migration through said backing.

8. A concatenation of strips of tape according to claim 7 wherein said barrier layer is a polymer to seal the backing and make it nonporous and nontacky.

9. A concatenation of strips of tape according to claim 7 wherein said nonadhesive sections comprise a length of said tape with the adhesive coated to detactify the same.

10. A concatenation of strips of tape according to claim 7 wherein said nonadhesive sections are formed by a strip of material laminated by said adhesive to said tape.

11. A concatenation of strips of tape according to claim 10 wherein said nonadhesive sections have an opening formed therein to receive a locating pin.

12. A concatenation of strips of tape according to claim 7 wherein a low-adhesion backsize is placed on said barrier layer to permit winding and unwinding of a plurality of said strips of tape.

13. A concatenation of strips of tape according to claim 6 wherein said nonadhesive sections have a weakened line extending transversely thereof to divide each said nonadhesive section and to afford separation of the strips within the sections.

14. A concatenation of strips of tape according to claim 6 wherein said nonadhesive sections are transversely perforated to afford separation of said nonadhesive sections into two parts.

* * * * *